United States Patent
Liu (10) Patent No.: US 12,231,954 B2
(45) Date of Patent: *Feb. 18, 2025

(54) DATA PACKET DISTRIBUTION METHOD, SENDER DEVICE, RECEIVER DEVICE AND STORAGE MEDIUM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,236

(22) Filed: Aug. 3, 2021

(65) Prior Publication Data

US 2021/0377799 A1   Dec. 2, 2021

Related U.S. Application Data

(63) Continuation of application No. 16/622,858, filed as application No. PCT/CN2017/102316 on Sep. 19, 2017, now Pat. No. 11,109,273.

(51) Int. Cl.
*H04W 40/22* (2009.01)
*H04W 24/10* (2009.01)
(Continued)

(52) U.S. Cl.
CPC .......... *H04W 28/08* (2013.01); *H04W 76/16* (2018.02); *H04W 88/06* (2013.01)

(58) Field of Classification Search
None
See application file for complete search history.

(56) References Cited

U.S. PATENT DOCUMENTS 7,100,078 B1   8/2006  Pass
9,501,914 B1 * 11/2016  Chen ...................... H04L 63/10
(Continued)

FOREIGN PATENT DOCUMENTS

CN   101383737 A   3/2009
CN   101904196 A   12/2010
(Continued)

OTHER PUBLICATIONS

European search report issued in corresponding European application No. 17926124.3 dated Mar. 30, 2020.
(Continued)

*Primary Examiner* — Gary Lafontant
(74) *Attorney, Agent, or Firm* — Young Basile Hanlon & MacFarlane, P.C.

(57) ABSTRACT

Disclosed are a data packet distribution method, a sender device, a receiver device, and a storage medium. The method comprises: when there is at least one communication link with a receiver device, acquiring a transmission state report, sent by the receiver device, for the at least one communication link; based on the transmission state report for the at least one communication link, selecting at least some communication links from the at least one communication link, and allocating a data transmission amount corresponding to each communication link of the at least some communication links; and based on the data transmission amount corresponding to each communication link of the at least some communication links, sending, on the at least some communication links, data to be sent.

17 Claims, 3 Drawing Sheets

(51) Int. Cl.
*H04W 28/08* (2023.01)
*H04W 76/16* (2018.01)
*H04W 88/06* (2009.01)

(56) References Cited

U.S. PATENT DOCUMENTS

| | | | | |
|---|---|---|---|---|
| 11,109,273 | B2* | 8/2021 | Liu | .................. H04W 28/0236 |
| 2006/0251105 | A1 | 11/2006 | Kim et al. | |
| 2008/0095247 | A1 | 4/2008 | Ohno et al. | |
| 2012/0218906 | A1 | 8/2012 | Lampinen et al. | |
| 2013/0322393 | A1 | 12/2013 | Kishiyama | |
| 2015/0020135 | A1* | 1/2015 | Frusina | .............. H04N 21/2405 |
| | | | | 725/116 |
| 2016/0174107 | A1 | 6/2016 | Kanugovi et al. | |
| 2017/0078945 | A1* | 3/2017 | Ma | ........................ H04W 24/10 |
| 2017/0222905 | A1 | 8/2017 | Leroux et al. | |

FOREIGN PATENT DOCUMENTS

| | | |
|---|---|---|
| CN | 102369675 A | 3/2012 |
| CN | 102905319 A | 1/2013 |
| CN | 103547327 A | 1/2014 |
| CN | 105101301 A | 11/2015 |
| CN | 105450536 A | 3/2016 |
| CN | 105703890 A | 6/2016 |
| CN | 112637901 A | 4/2021 |
| EP | 1689134 A2 | 8/2006 |
| JP | 2007266906 A | 10/2007 |
| JP | 2012175267 A | 9/2012 |
| WO | 2006054442 A1 | 5/2006 |
| WO | 2015103647 A1 | 7/2015 |
| WO | 2016092356 A1 | 6/2016 |

OTHER PUBLICATIONS

3GPP TS 36.300 V13.2.0 (Dec. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 23.161 V14.0.0 (Mar. 2017); 3rd Generation Partnership Project; Technical pecification Group Services and System Aspects; Network-Based IP Flow Mobility (NBIFOM); Stage 2 (Release 14).
Indian Examination Report for IN Application 201917051799 mailed Mar. 31, 2021. (6 pages).
International Search Report with English Translation for PCT/CN2017/102316 mailed Jun. 14, 2018.
Japanese Notice of Reasons for Refusal with English Translation for JP Application 2020-502217 mailed Sep. 28, 2021. (11 pages).
Communication pursuant to Article 94(3) EPC for EP Application 17926124.3 mailed Dec. 9, 2021. (7 pages).
Chinese Third Office Action with English Translation for CN Application 202011574522.4, mailed Oct. 25, 2022 (21 pages).
Chinese Frist Office Action with English Translation for CN Application 202011574522.4 mailed Apr. 29, 2022. (21 pages).
Korean Office Action with English Translation for KR Application 1020207002588 mailed Mar. 27, 2022. (11 pages).
China Second Office Action with English Translation for CN Application 202011574522.4 mailed Jul. 26, 2022.
Chinese Decision of Rejection with English Translation for CN Application 202011574522.4 mailed Jan. 28, 2023. (19 pages).
Communication pursuant to Article 94(3) EPC for EP Application 17926124.3 mailed Jun. 15, 2023. (8 pages).
China Decision on Reexamination and English translation for CN Application No. 202011574522.4, issued May 9, 2024, 34 pages.
China Notification of Reexamination and English Translation for CN Application No. 2020115745224, Issue No. 2024011101045990 dated Jan. 16, 2024, 8 pages.
China Notification of Reexamination and English Translation for CN Application No. 2020115745224, Issue No. 2024032100843360 dated Mar. 26, 2024, 15 pages.
Chinese First Office Action and English translation for Chinese Patent Application No. 201780095011.4, issued Aug. 30, 2024, 27 pages.

* cited by examiner

DATA PACKET DISTRIBUTION METHOD, SENDER DEVICE, RECEIVER DEVICE AND STORAGE MEDIUM

CROSS-REFERENCE TO RELATED APPLICATION(S)

The present application is a U.S. patent application Ser. No. 16/622,858 filed on Dec. 13, 2019, which is a 371 of International PCT Application No. PCT/CN2017/102316, having an international filing date of Sep. 19, 2017. The entire contents of the above-identified applications are incorporated herein by reference.

TECHNICAL FIELD

The present disclosure relates to data transmission technology in the communication field, in particular to a method for distributing data packets, a sender device, a receiver device and a storage medium.

BACKGROUND

In a 5G system, data transmission may be performed between a terminal and a network through multi-connections, for example, through a 3GPP or a non-3GPP network access service, or through connections of different RATs within a 3GPP system. However, in the prior art, when data distribution of multiple links is performed, a transmission situation is not combined, so that a transmission mode which better fits an application scenario cannot be provided for service data to be transmitted, and thus transmission efficiency of a system cannot be guaranteed.

SUMMARY

Implementations of the present disclosure provide a method for distributing data packets, a sender device, a receiver device and a storage medium.

An implementation of the present disclosure provides a method for distributing data packets, which is applied to a sender device, and the method includes: when there exists at least one communication link with a receiver device, acquiring a transmission status report for the at least one communication link sent by the receiver device; selecting at least part of the at least one communication link and allocating a data transmission amount corresponding to each communication link in the at least part of the at least one communication link, based on the transmission status report for the at least one communication link; and sending out data to be sent on the at least part of the at least one communication link, based on the data transmission amount corresponding to the each communication link in the at least part of the at least one communication link.

An implementation of the present disclosure provides a method for distributing data packets, which is applied to a receiver device, and the method includes: when there exists at least one communication link with a sender device, sending a transmission status report for the at least one communication link to the sender device; wherein the transmission status report is used for causing the sender device to select at least part of the at least one communication link and allocate a data transmission amount corresponding to each communication link in the at least part of the at least one communication link, based on the transmission status report for the at least one communication link.

Implementations of the present disclosure provide a sender device, and the device includes: a first communication unit, which, when there exists at least one communication link with a receiver device, acquires a transmission status report for the at least one communication link sent by the receiver device; and a first processing unit, which selects at least part of the at least one communication link and allocates a data transmission amount corresponding to each communication link in the at least part of the at least one communication link, based on the transmission status report for the at least one communication link; the first communication unit sends out data to be sent on the at least part of the at least one communication link based on the data transmission amount corresponding to the each communication link in the at least part of the at least one communication link.

Implementations of the present disclosure provide a receiver device, and the device includes: a second communication unit, which, when there exists at least one communication link with a sender device, sends a transmission status report for the at least one communication link to the sender device; wherein the transmission status report is used for causing the sender device to select at least part of the at least one communication link and allocate a data transmission amount corresponding to each communication link in the at least part of the at least one communication link, based on the transmission status report for the at least one communication link.

Implementations of the present disclosure provide a sender device, and the sender device includes a processor and a memory for storing a computer program which is capable of running on the processor.

The processor is used for, when running the computer program, performing acts of the aforementioned method.

Implementations of the present disclosure provide a receiver device, and the device includes a processor and a memory for storing a computer program which is capable of running on the processor.

The processor is used for, when running the computer program, performing acts of the aforementioned method.

A computer storage medium provided by an implementation of the present disclosure has stored computer-executable instructions, the computer-executable instructions, when being executed, perform the acts of the aforementioned method.

DETAILED DESCRIPTION

To understand features and technical contents of implementations of the present disclosure in more detail, realizations of the implementations of the present disclosure will be described in detail below with reference to the drawings, which are used only for reference but not intended to limit the implementations of the present disclosure.

Implementation One

Figure 1:
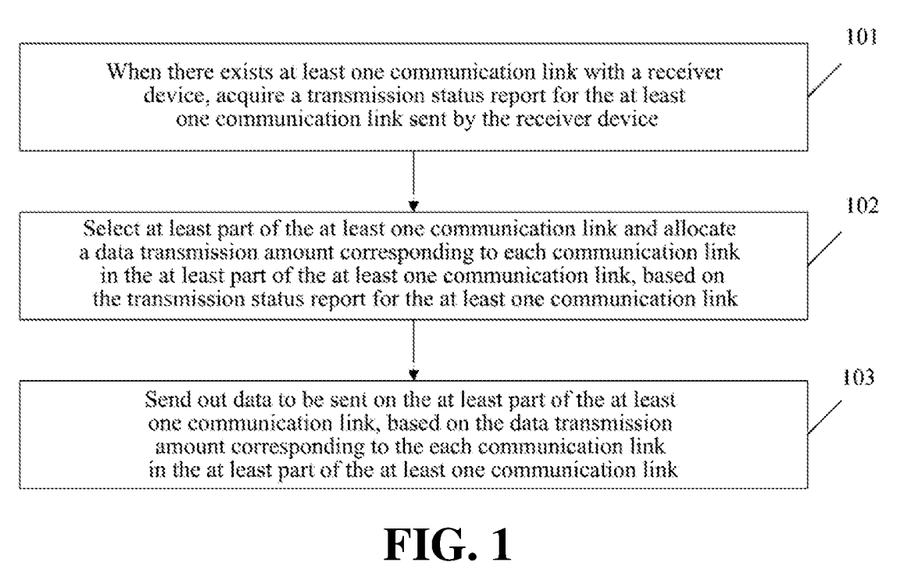
FIG. 1 is a flow chart of a method for distributing data packets provided by an implementation of the present disclosure.

An implementation of the present disclosure provides a method for distributing data packets, which is applied to a sender device. As shown in FIG. 1, the method includes acts 101-103.

In act 101, when there exists at least one communication link with a receiver device, a transmission status report for the at least one communication link sent by the receiver device is acquired.

In act 102, at least part of the at least one communication link is selected, and a data transmission amount corresponding to each communication link in the at least part of the at least one communication link is allocated, based on the transmission status report for the at least one communication link.

In act 103, data to be sent is sent out on the at least part of the at least one communication link based on the data transmission amount corresponding to the each communication link in the at least part of the at least one communication link.

Here, the sender device may be a data distribution device unit at a network side or a terminal; and the receiver device may also be a data distribution device unit at a network side or a terminal.

The present implementation is applicable to a scenario in which one or more communication links exist between the sender device and the receiver device. When multiple communication links exist between the sender and the receiver, the sender determines whether to distribute data to this communication link according to a transmission status situation of each communication link. Further, the data transmission amount corresponding to data sent in the communication link may also be determined according to the transmission status situation. In the following, there are some examples.

Scenario One

When one communication link exists between the sender device and the receiver device, in the above act 102, that the at least part of the at least one communication link is selected, and the data transmission amount corresponding to the each communication link in the at least part of the at least one communication link is allocated, based on the transmission status report for the at least one communication link, includes: the communication link is used as the selected communication link, and the data transmission amount on the selected communication link is allocated.

Correspondingly, in act 103, data to be sent is sent on the communication link based on the data transmission amount.

Scenario two: a scenario where the at least one communication link includes two or more communication links.

For both the aforementioned scenario one and scenario two, the receiver needs to determine a transmission status of the communication link and send the transmission status report to the sender. It may be understood that the transmission status report may be acquired through a data interaction process between the receiver device and the sender device before act 101. That is, before the act 101 is performed, the sender device and the receiver device have already performed data interaction, and have already performed data interaction on at least one communication link, then before the act 101, a packet loss situation and a data rate will be detected while the data interaction is performed.

In addition, the receiver device performs detection of the packet loss situation or detection of the data rate, and reporting may be triggered by a comparison between a packet loss rate and a threshold, or may be triggered periodically. Of course, there may be other triggering modes, which are not restricted and exhaustive in this implementation.

For scenario one and scenario two, the transmission status report may include a packet loss situation of data packets, and/or parameters such as a data rate of the communication link.

That the transmission status report for the at least one communication link sent by the receiver device is acquired, includes: a first lost data packet and a last lost data packet corresponding to each communication link in the at least one communication link sent by the receiver device for the each communication link are acquired, and a quantity of lost data packets between the first lost data packet and the last lost data packet is acquired; or, a quantity of lost data packets or a proportion of lost data packets corresponding to each communication link in the at least one communication link sent by the receiver for the each communication link is acquired.

And/or, that the transmission status report for the at least one communication link sent by the receiver device is acquired, further includes: a data rate corresponding to each communication link in the at least one communication link sent by the receiver for the each communication link is acquired.

The method further includes: a sequence number is configured for the data packet to be sent. The sender assigns a sequence number to each data packet (i.e. unit data) to be sent which is sent to a transmitter; and the sequence number is used for identifying different data packets.

The specific mode is as follows:

1) The receiver sends the first lost data packet and the last lost data packet, and the quantity of the lost data packets between the first lost data packet and the last lost data packet, to the sender; wherein, the data packet may be indicated by the sequence number.
2) A quantity of lost data packets or a proportion of lost data packets is sent periodically, wherein the quantity or the proportion is counted in this period. It may be understood as that the counting for a previous period before act 101 is performed; or a counting for previous N periods before act 101 is performed, where N is greater than or equal to 2.

That the at least part of the at least one communication link is selected from the at least one communication link based on the transmission status report for the at least one communication link, includes at least one of the following two conditions.

Condition One:

A communication link of which a quantity of lost data packets is less than a first threshold or a proportion of lost data packets is less than a second threshold is selected based on the transmission status report for the at least one communication link. Wherein, the first threshold may be set according to an actual situation, for example, it may be set as 20. That is to say, assuming that a total of 100 data packets were sent in a previous period, the first threshold may be 20, then if less than 20 data packets are lost, the communication link may be considered as a communication link that may be selected. The second threshold may be set according to an actual situation, for example, it may be set as 5%. That is to say, if a packet loss rate in 100 data packets is less than 5%, then the communication link may be selected for data transmission in a next period.

It may be understood that a mode for determining the above two thresholds may be for the aforementioned scenario two. In addition, if at least one communication link is for the situation of the aforementioned scenario one, that is, when there is only one communication link, the first threshold or the second threshold may be set higher, i.e., when only the communication link may be selected, the communication link is selected regardless of whether the packet loss rate or the quantity of lost data packets of the communication link is relatively great.

Condition Two:

A communication link of which a data rate matches with a service type and/or a transmission rate of a data packet to be sent is selected based on the transmission status report for the at least one communication link.

The service type and the transmission rate of the data packet to be sent may be acquired from attribute information of the data packet, or may be acquired from another parameter, and the specific acquiring mode is not restricted.

In addition, that the data rate of the communication link matches with the service type, may be understood as when the service type is a service type with a low delay and a small data amount, a service type with a high delay and a large data amount, etc., it is not exhaustive in this implementation. It needs to be pointed out that transmission rates with which different service types need to match are also different.

Correspondingly, data rates of communication links needed by different service types are also different. For example, for a service type with a low delay and a small data amount, the communication link with a higher data rate may be selected, or the communication link with a data rate higher than a first rate threshold may be selected, wherein the first rate threshold is a lowest rate with which the service type may be supported for data transmission. For another example, for a service type with a high delay and a large data amount, a communication link with a lower data rate may be selected, wherein the data rate may be higher than a second rate threshold, and the second threshold is a lowest rate with which the service type is supported for data transmission.

It need also to be understood that the aforementioned condition one and condition two may be used separately or simultaneously, which is not exhaustive in this implementation.

Correspondingly, that the data transmission amount corresponding to the each communication link in the at least part of the at least one communication link is allocated, includes the following two modes.

Mode One:

The data transmission amount corresponding to each communication link in the at least part of the at least one communication link is determined based on a quantity of lost data packets or a proportion of lost data packets in the transmission status report for the each communication link.

After a part of the at least one communication link is selected, corresponding to the aforementioned scenario one, i.e., when there is only one communication link, a data transmission amount of the communication link may be determined based on a situation of lost data packets of the communication link. Wherein, the data transmission amount may be understood as a data transmission rate or may be considered as a total transmission amount of data transmitted within a next period, and the data transmission amount may be defined according to an actual situation.

Corresponding to the aforementioned scenario two, i.e., when two or more communication links are selected, a smaller data transmission amount may be allocated for a communication link with more lost data packets or a larger proportion of lost data packets; while a larger data transmission amount is allocated for a communication link with less lost data packets or a smaller proportion of lost data packets.

For example, there are currently 3 communication links, which are designated as communication links 1, 2 and 3 respectively. A packet loss rate of the communication link 1 is large, a packet loss rate of the communication link 2 is medium, and a packet loss rate of the communication link 3 is small. Then a larger proportion of the data transmission amount may be allocated for the communication link 3, a smaller proportion of the data transmission amount may be allocated for the communication link 1, and the rest may be allocated for the communication link 2.

Specifically, the data transmission amount corresponding to a packet loss situation with which proportion or which quantity, may be allocated according to an actual situation, and this allocation mode has also a relation with a quantity of selected partial communication links. For example, first the data transmission amount may be divided equally according to the quantity of the selected partial communication links, and then a preset amount of a data transmission may be added to the communication link with less lost packets according to a packet loss situation of each communication link. There may be many specific allocation and calculation modes, not just the allocation mode described in this implementation, but they are not exhaustive in this implementation.

Mode Two:

The data transmission amount corresponding to each communication link in the at least part of the at least one communication link is determined based on a data rate in the transmission status report for the each communication link.

After a part of the at least one communication link is selected, corresponding to the aforementioned scenario one, i.e., when there is only one communication link, a data transmission amount of the communication link may be determined based on a data rate situation of the communication link. Wherein, the data transmission amount may be understood as a data transmission rate or may be considered as a total transmission amount of data transmitted within a next period, and the data transmission amount may be defined according to an actual situation.

Corresponding to the aforementioned scenario two, i.e., when two or more communication links are selected, a larger data transmission amount may be allocated for a communication link with a larger data rate; while a smaller data transmission amount may be allocated for a communication link with a smaller data rate. For example, there are currently two communication links, which are designated as communication links 1 and 2 respectively; a data rate of the communication link 1 is larger and a data rate of the communication link 2 is smaller. Then a larger proportion of the data transmission amount may be allocated for the communication link 1 and a smaller proportion of the data transmission amount may be allocated for the communication link 2.

There may be many specific allocation and calculation modes, not just the allocation mode described in this implementation, but they are not exhaustive in this implementation.

On the basis of the solution of the aforementioned implementation, this implementation further includes that the sender device determines with the receiver device whether to feed back the transmission status report for negotiation. Specifically, whether the receiver device feeds back the transmission status report of the communication link is determined through signaling interaction with the receiver device; or, a flag is set in a preset bit to indicate whether the receiver device feeds back the transmission status report of the communication link through the set flag. Whether to feed back a data status report may be determined by a specific bit in a data unit received by the receiver. Wherein, the specific bit may be specified by a flag set in one or several specified bits in a data packet. For example, a 10th bit of the data packet may be set to be a position which specifies whether to feed back the of the transmission status report of the communication link. If the bit is assumed to be 1, it may be determined that the feedback is needed, and if the bit is assumed to be 0, it may be determined that the feedback is not needed; and vice versa, as long as both parties have the same predefinition.

Further, the data packets to be sent mentioned in this implementation may be data packets from a same service data stream or QoS stream or a same bearer or a same PDU connection; or, may be data packets from different service data streams or QoS streams or bearers or PDU connections. Different service data may be from different systems, for example, one service may be a 3GPP service and another service may be a non-3GPP service.

The sender or receiver is a data distribution equipment unit on the network side and has a connection with those multiple communication links.

Figure 2:
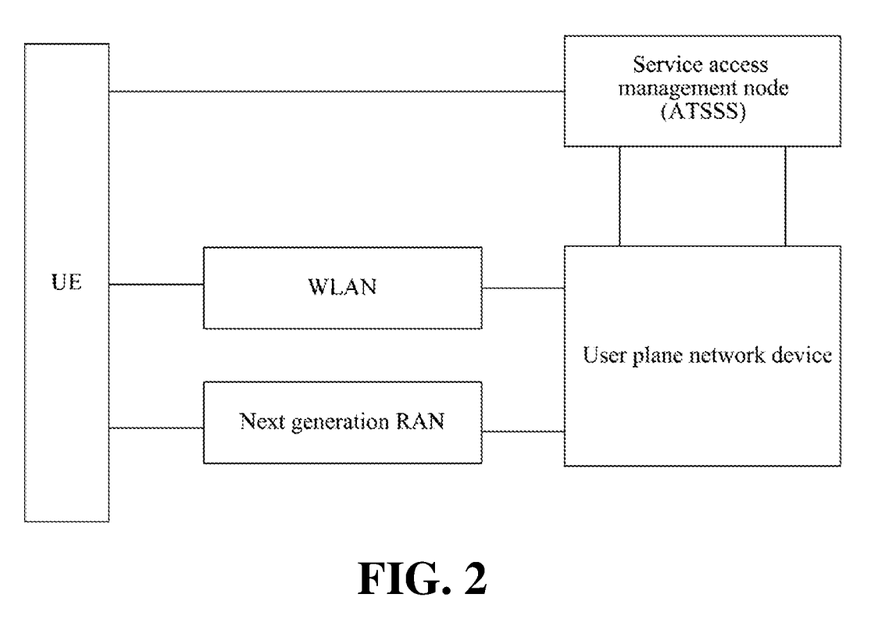
FIG. 2 is a schematic diagram of a network architecture.
Figure 3:
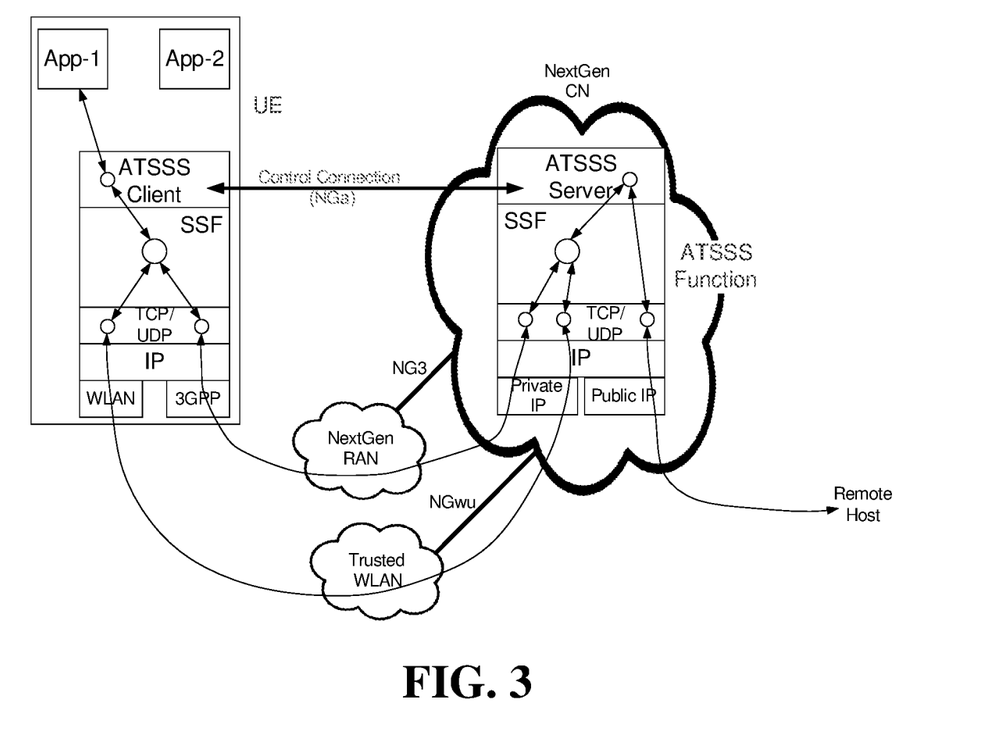
FIG. 3 is a schematic diagram of a transmission scenario.

In the following, accessing simultaneously through 3GPP and non-3GPP is taken as an example, as shown in FIGS. 2 and 3. There will be a service access network node on the network side, wherein the service access network node is responsible for management of access through the 3GPP or the non-3GPP network. A service access management node is ATSSS, and a UP function is a user plane network device of a core network. WLAN is a non-3GPP system, and RAN is a 3GPP access system. A terminal or the ATSSS may choose to separate services of the terminal, and transmit them simultaneously in a 3GPP or a non-3GPP network when the terminal initiates the service or during the service progress, so as to improve a service throughput. On the basis of the aforementioned solution provided in this implementation, selection of the communication link and allocation of the data amount may be performed based on a processing situation of each link.

It can be seen that by adopting the above solution, in combination with a transmission status report of the communication link between the sender and the receiver, a communication link can be selected, and data transmission amounts in different communication links can be allocated. In combination with status situations of different communication links, a communication link is selected for data to be sent and a data amount on each communication link is allocated, so that data finally sent are enabled to more match with an actual situation of transmission, improving transmission efficiency of the system.

Implementation Two

An implementation of the present disclosure provides a method for distributing data packets, which is applied to a receiver device, and the method includes: when there exists at least one communication link with a sender device, a transmission status report for the at least one communication link is sent to the sender device; wherein the transmission status report is used for causing the sender device to select at least part of the at least one communication link and allocate a data transmission amount corresponding to each communication link in the at least part of the at least one communication link, based on the transmission status report for the at least one communication link.

Here, the sender device may be a data distribution device unit at a network side or a terminal; and the receiver device may also be a data distribution device unit at a network side or a terminal.

The present implementation is applicable to a scenario in which one or more communication links exist between the sender device and the receiver device. When multiple communication links exist between the sender and the receiver, the sender determines, according to a transmission status situation of each communication link, whether to distribute data to this communication link. Further, the data transmission amount corresponding to data sent in the communication link may also be determined according to the transmission status situation. For example, in scenario one, one communication link exists between the sender device and the receiver device; and in scenario two, the at least one communication link includes two or more communication links.

For both the aforementioned scenario one and scenario two, the receiver needs to determine a transmission status of the communication link and send the transmission status report to the sender. That the transmission status report for the at least one communication link is sent to the sender device, includes: a first lost data packet and a last lost data packet corresponding to each communication link in the at least one communication link, and a quantity of lost data packets between the first lost data packet and the last lost data packet are sent to the sender device, for the each communication link; or, a quantity of lost data packets or a proportion of lost data packets corresponding to each communication link in the at least one communication link is sent to the sender device, for the each communication link.

The method further includes: the transmission status report for the at least one communication link is sent to the sender device, when a quantity of lost data packets counted exceeds a quantity reporting threshold or a proportion of lost data packets counted exceeds a proportion reporting threshold in a counting period; or, the transmission status report for the at least one communication link is sent to the sender device, when a quantity of lost data packets counted is lower than a quantity reporting threshold or a proportion of lost data packets counted is lower than a proportion reporting threshold in a counting period.

That is to say, a mode for triggering event reporting may be: a receiving end sends the status report indication to a sending end when a quantity of lost data packets counted is greater than or equal to a preconfigured threshold or a proportion of lost data packets counted is greater than or equal to a preconfigured threshold in a counting period; and sends the status report indication to the sending end when a quantity of lost data packets counted is less than a preconfigured threshold or a proportion of lost data packets counted is less than a preconfigured threshold in a counting period.

The preconfigured period or threshold may be configured through negotiation between the sending end and the receiving end or may be configured directly through the network side.

That the transmission status report for the at least one communication link is sent to the sender device, includes: a data rate corresponding to each communication link in the at least one communication link is acquired, and the data rate corresponding to the each communication link is sent to the sender device.

A data rate of each communication link is calculated in a counting period, and a transmission status report is sent to the sender device when the data rate of the communication link does not exceed a preset rate threshold.

That is to say, the receiver calculates a data rate of each communication link according to a preconfigured counting period and periodically sends this data rate to the sender; or, the receiver calculates a data rate of each communication link according to a preconfigured counting period, and sends status indication information to the sender when that data rate is lower than or equal to a predefined threshold.

It need also to be pointed out that the receiver may determine whether to feed back a data status report based on a configuration of the network, that is, whether to feed back the transmission status report of the communication link is determined through signaling interaction with the sender device; or, the receiver may detect a flag set in a preset bit sent by the sender device to determine whether to feed back the transmission status report of the communication link; i.e., whether to feed back the data status report may be determined by a specific bit in a data unit received by the receiver.

It can be seen that by adopting the above solution, in combination with a transmission status report of the communication link between the sender and the receiver, a communication link can be selected, and data transmission amounts in different communication links can be allocated. In combination with status situations of different communication links, a communication link is selected for data to be sent and a data amount on each communication link is allocated, so that data finally sent are enabled to more match with an actual situation of transmission, improving transmission efficiency of the system.

Implementation Three

Figure 4:
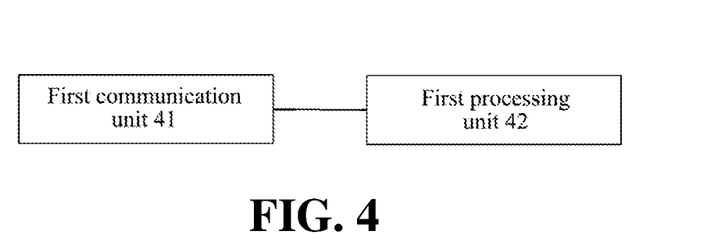
FIG. 4 is a schematic diagram of a structure of a sender device according to an implementation of the present disclosure.

An implementation of the present disclosure provides a sender device. As shown in FIG. 4, the sender device includes a first communication unit 41, and a first processing unit 42.

The first communication unit 41 is used for, when there exists at least one communication link with a receiver device, acquiring a transmission status report for the at least one communication link sent by the receiver device.

The first processing unit 42 is used for selecting at least part of the at least one communication link and allocating a data transmission amount corresponding to each communication link in the at least part of the at least one communication link, based on the transmission status report for the at least one communication link.

The first communication unit 41 is further used for sending out data to be sent on the at least part of the at least one communication link based on the data transmission amount corresponding to the each communication link in the at least part of the at least one communication link.

Here, the sender device may be a data distribution device unit at a network side or a terminal; and the receiver device may also be a data distribution device unit at a network side or a terminal.

The present implementation is applicable to a scenario in which one or more communication links exist between the sender device and the receiver device. When multiple communication links exist between the sender and the receiver, the sender determines whether to distribute data to this communication link according to a transmission status situation of each communication link. Further, the data transmission amount corresponding to data sent in the communication link may also be determined according to the transmission status situation. In the following, there are some examples.

Scenario One

When one communication link exists between the sender device and the receiver device, that the at least part of the at least one communication link is selected, and the data transmission amount corresponding to the each communication link in the at least part of the at least one communication link is allocated, based on the transmission status report for the at least one communication link, includes: the communication link is used as the selected communication link, and the data transmission amount on the selected communication link is allocated.

Correspondingly, data to be sent is sent on the communication link based on the data transmission amount.

Scenario two: a scenario where the at least one communication link includes two or more communication links.

For both the aforementioned scenario one and scenario two, the receiver needs to determine a transmission status of the communication link and send the transmission status report to the sender. It may be understood that the transmission status report may be acquired through a data interaction process between the receiver device and the sender device, that is, before the aforementioned processing is performed, the sender device and the receiver device have already performed data interaction, and have already performed data interaction on at least one communication link, a packet loss situation and a data rate are detected while the data interaction is performed.

In addition, the receiver device performs detection of the packet loss situation or detection of the data rate and reporting may be triggered by a comparison between a packet loss rate and a threshold, or may be triggered periodically. Of course, there may be other triggering modes, which are not restricted and exhaustive in this implementation.

For scenario one and scenario two, the transmission status report may include a packet loss situation of data packets, and/or parameters such as a data rate of the communication link.

The first communication unit is used for acquiring a first lost data packet and a last lost data packet corresponding to each communication link in the at least one communication link sent by the receiver device for the each communication link, and acquiring a quantity of lost data packets between the first lost data packet and the last lost data packet; or, acquiring a quantity of lost data packets or a proportion of lost data packets corresponding to each communication link in the at least one communication link sent by the receiver for the each communication link.

And/or, that the transmission status report for the at least one communication link sent by the receiver device is acquired, further includes: a data rate corresponding to each communication link in the at least one communication link sent by the receiver for the each communication link is acquired.

The first communication unit is used for configuring a sequence number for the data packet to be sent. The sender assigns a sequence number to each data packet (i.e. unit data) to be sent which is sent to a transmitter; and the sequence number is used for identifying different data packets.

The specific mode is as follows:
1) The receiver sends the first lost data packet and the last lost data packet, and the quantity of the data packets lost between the first lost data packet and the last lost data packet, to the sender; wherein, the data packet may be indicated by the sequence number.
2) A quantity of lost data packets or a proportion of lost data packets is sent periodically, wherein the quantity or the proportion is counted in this period. It may be understood as that the counting for a previous period is performed; or a counting for previous N periods is performed, where N is greater than or equal to 2.

That the at least part of the at least one communication link is selected from the at least one communication link based on the transmission status report for the at least one communication link, includes at least one of the following two conditions.

Condition One:

The first processing unit is used for selecting a communication link of which a quantity of lost data packets is less than a first threshold or a proportion of lost data packets is less than a second threshold based on the transmission status report for the at least one communication link. Wherein, the first threshold may be set according to an actual situation, for Example, it may be set as 20. That is to say, assuming that a total of 100 data packets were sent in a previous period, then the first threshold may be 20, then if less than 20 data packets are lost, the communication link may be considered as a communication link that may be selected. The second threshold may be set according to an actual situation, for example, it may be set as 5%. That is to say, if a packet loss rate in 100 data packets is less than 5%, then the communication link may be selected for data transmission in a next period.

It may be understood that a mode for determining the above two thresholds may be for the aforementioned scenario two. In addition, if at least one communication link is for the situation of the aforementioned scenario one, that is, when there is only one communication link, the first threshold or the second threshold may be set higher, i.e., when only the communication link may be selected, the communication link is selected regardless of whether the packet loss rate or the quantity of lost data packets of the communication link is relatively great.

Condition Two:

The first processing unit is used for selecting a communication link of which a data rate matches with a service type and/or a transmission rate of a data packet to be sent based on the transmission status report for the at least one communication link.

The service type and the transmission rate of the data packet to be sent may be acquired from attribute information of the data packet, or may be acquired from another parameter, and the specific acquiring mode is not restricted.

In addition, that the data rate of the communication link matches with the service type, may be understood as when the service type is a service type with a low delay and a small data amount, a service type with a high delay and a large data amount, etc., it is not exhaustive in this implementation. It needs to be pointed out that transmission rates with which different service types need to match are also different.

Correspondingly, data rates of communication links needed by different service types are also different. For example, for a service type with a low delay and a small data amount, the communication link with a higher data rate may be selected, or the communication link with a data rate higher than a first rate threshold may be selected, wherein the first rate threshold is a lowest rate with which the service type may be supported for data transmission. For another example, for a service type with a high delay and a large data amount, a communication link with a lower data rate may be selected, wherein the data rate may be higher than a second rate threshold, and the second threshold is a lowest rate with which the service type is supported for data transmission.

It need also to be understood that the aforementioned condition one and condition two may be used separately or simultaneously, which is not exhaustive in this implementation.

Correspondingly, that the data transmission amount corresponding to the each communication link in the at least part of the at least one communication link is allocated, includes the following two modes.

Mode One:

The first processing unit is used for determining the data transmission amount corresponding to each communication link in the at least part of the at least one communication link based on a quantity of lost data packets or a proportion of lost data packets in the transmission status report for the each communication link.

After a part of the at least one communication link is selected, corresponding to the aforementioned scenario one, i.e., when there is only one communication link, a data transmission amount of the communication link may be determined based on a situation of lost data packets of the communication link. Wherein, the data transmission amount may be understood as a data transmission rate or may be considered as a total transmission amount of data transmitted within a next period, and the data transmission amount may be defined according to an actual situation.

Corresponding to the aforementioned scenario two, i.e., when two or more communication links are selected, a smaller data transmission amount may be allocated for a communication link with more lost data packets or a larger proportion of lost data packets; while a larger data transmission amount is allocated for a communication link with less lost data packets or a smaller proportion of lost data packets.

For example, there are currently 3 communication links, which are designated as communication links 1, 2 and 3 respectively. A packet loss rate of the communication link 1 is large, a packet loss rate of the communication link 2 is medium, and a packet loss rate of the communication link 3 is small. Then a larger proportion of the data transmission amount may be allocated for the communication link 3, a smaller proportion of the data transmission amount may be allocated for the communication link 1, and the rest may be allocated for the communication link 2.

Specifically, the data transmission amount corresponding to a packet loss situation with which proportion or which quantity, may be allocated according to an actual situation, and this allocation mode has also a relation with a quantity of selected partial communication links. For example, first the data transmission amount may be divided equally according to the quantity of the selected partial communication links, and then a preset amount of a data transmission may be added to the communication link with less lost packets according to a packet loss situation of each communication link. There may be many specific allocation and calculation modes, not just the allocation mode described in this implementation, but they are not exhaustive in this implementation.

Mode 2, the first processing unit is used for determining the data transmission amount corresponding to each communication link in the at least part of the at least one communication link based on a data rate in the transmission status report for the each communication link.

After a part of the at least one communication link is selected, corresponding to the aforementioned scenario one, i.e., when there is only one communication link, a data transmission amount of the communication link may be determined based on a data rate situation of the communication link. Wherein, the data transmission amount may be understood as a data transmission rate or may be considered as a total transmission amount of data transmitted within a next period, and the data transmission amount may be defined according to an actual situation.

Corresponding to the aforementioned scenario two, i.e., when two or more communication links are selected, a larger data transmission amount may be allocated for a communication link with a larger data rate; while a smaller data transmission amount may be allocated for a communication link with a smaller data rate. For example, there are currently two communication links, which are designated as communication links 1 and 2 respectively; a data rate of the communication link 1 is larger and a data rate of the communication link 2 is smaller. Then a larger proportion of the data transmission amount may be allocated for the communication link 1 and a smaller proportion of the data transmission amount may be allocated for the communication link 2.

There may be many specific allocation and calculation modes, not just the allocation mode described in this implementation, but they are not exhaustive in this implementation.

On the basis of the solution of the aforementioned implementation, this implementation further includes that the sender device determines with the receiver device whether to feed back the transmission status report for negotiation. Specifically, whether the receiver device feeds back the transmission status report of the communication link is determined through signaling interaction with the receiver device; or, a flag is set in a preset bit to indicate whether the receiver device feeds back the transmission status report of the communication link through the set flag. Whether to feed back the data status report may be determined by a specific bit in a data unit received by the receiver. Wherein, the specific bit may be specified by a flag set in one or several specified bits in a data packet. For example, a 10th bit of the data packet may be set to be a position which specifies whether to feed back the of the transmission status report of the communication link. If the bit is assumed to be 1, it may be determined that the feedback is needed, and if the bit is assumed to be 0, it may be determined that the feedback is not needed; and vice versa, as long as both parties have the same predefinition.

Further, the data packets to be sent mentioned in this implementation may be data packets from a same service data stream or QoS stream or a same bearer or a same PDU connection; or, may be data packets from different service data streams or QoS streams or bearers or PDU connections. Different service data may be from different systems, for example, one service may be a 3GPP service and another service may be a non-3GPP service.

The sender or receiver is a data distribution equipment unit on the network side and has a connection with those multiple communication links.

It can be seen that by adopting the above solution, in combination with a transmission status report of the communication link between the sender and the receiver, a communication link can be selected, and data transmission amounts in different communication links can be allocated. In combination with status situations of different communication links, a communication link is selected for data to be sent and a data amount on each communication link is allocated, so that data finally sent are enabled to more match with an actual situation of transmission, improving transmission efficiency of the system.

Implementation Four

Figure 5:
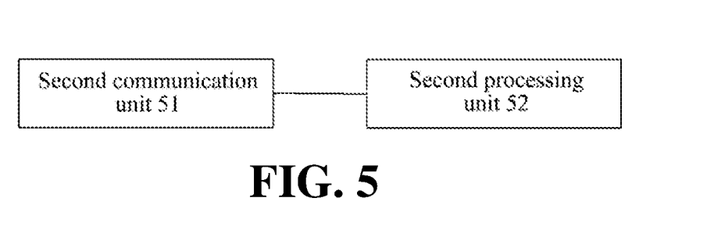
FIG. 5 is a schematic diagram of a structure of a receiver device according to an implementation of the present disclosure.

An implementation of the present disclosure provides a receiver device. As shown in FIG. 5, the receiver device includes a second communication unit 51 and a second processing unit 52.

The second communication unit 51 is used for, when there exists at least one communication link with a sender device, sending a transmission status report for the at least one communication link to the sender device; wherein the transmission status report is used for causing the sender device to select at least part of the at least one communication link and allocate a data transmission amount corresponding to each communication link in the at least part of the at least one communication link, based on the transmission status report for the at least one communication link.

Here, the sender device may be a data distribution device unit at a network side or a terminal; and the receiver device may also be a data distribution device unit at a network side or a terminal.

The present implementation is applicable to a scenario in which one or more communication links exist between the sender device and the receiver device. When multiple communication links exist between the sender and the receiver, the sender determines whether to distribute data to this communication link according to a transmission status situation of each communication link. Further, the data transmission amount corresponding to data sent in the communication link may also be determined according to the transmission status situation. For example, in scenario one, one communication link exists between the sender device and the receiver device; and in scenario two, at least one communication link includes two or more communication links.

For both the aforementioned scenario one and scenario two, the receiver needs to determine a transmission status of the communication link and send the transmission status report to the sender. That the transmission status report for the at least one communication link is sent to the sender device, includes: the second communication unit is used for sending a first lost data packet and a last lost data packet corresponding to each communication link in the at least one communication link, and a quantity of lost data packets between the first lost data packet and the last lost data packet to the sender device, for the each communication link; or, sending a quantity of lost data packets or a proportion of lost data packets corresponding to each communication link in the at least one communication link to the sender device, for the each communication link.

The receiver device further includes: the second processing unit 52, which sends the transmission status report for the at least one communication link to the sender device when a quantity of lost data packets counted exceeds a quantity reporting threshold or a proportion of lost data packets counted exceeds a proportion reporting threshold in a counting period; or, sends the transmission status report for the at least one communication link to the sender device, when a quantity of lost data packets counted is lower than a quantity reporting threshold or a proportion of lost data packets counted is lower than a proportion reporting threshold in a counting period.

That is to say, a mode for triggering event reporting may be: a receiving end sends the status report indication to a sending end when a quantity of lost data packets counted is greater than or equal to a preconfigured threshold or a proportion of lost data packets counted is greater than or equal to a preconfigured threshold in a counting period; and sends the status report indication to the sending end when a quantity of lost data packets counted is less than a preconfigured threshold or a proportion of lost data packets counted is less than a preconfigured threshold in a counting period.

The preconfigured period or threshold may be configured through negotiation between the sending end and the receiving end or may be configured directly through the network side.

The second processing unit 52 acquires a data rate corresponding to each communication link in the at least one communication link; and the second communication unit 51 sends the data rate corresponding to the each communication link to the sender device.

The second processing unit calculates a data rate of each communication link in the counting period, and sends the transmission status report to the sender device when the data rate of the communication link does not exceed a preset rate threshold.

That is to say, the receiver calculates a data rate of each communication link according to a preconfigured counting period and periodically sends this data rate to the sender; or, the receiver calculates a data rate of each communication link according to a preconfigured counting period, and sends status indication information to the sender when this data rate is lower than or equal to a predefined threshold.

It need also to be pointed out that the receiver may determine whether to feed back a data status report based on a configuration of the network, that is, whether to feed back the transmission status report of the communication link is determined through signaling interaction with the sender device; or, the receiver may detect a flag set in a preset bit sent by the sender device to determine whether to feed back the transmission status report of the communication link; i.e., whether to feed back the data status report may be determined by a specific bit in a data unit received by the receiver.

It can be seen that by adopting the above solution, in combination with a transmission status report of the communication link between the sender and the receiver, a communication link can be selected, and data transmission amounts in different communication links can be allocated. In combination with status situations of different communication links, a communication link is selected for data to be sent and a data amount on each communication link is allocated, so that data finally sent are enabled to more match with an actual situation of transmission, improving transmission efficiency of the system.

Figure 6:
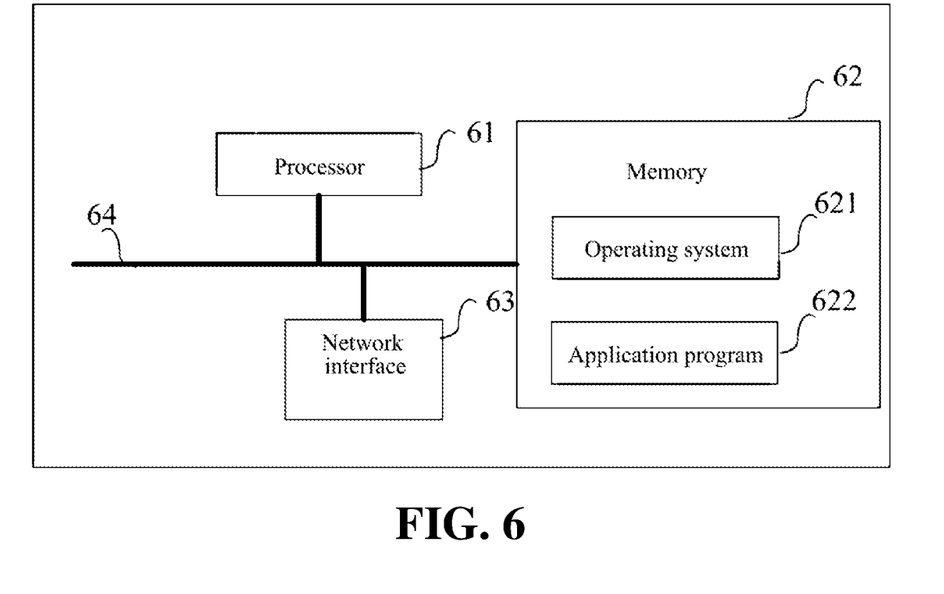
FIG. 6 is a schematic diagram of architecture of hardware according to an implementation of the present disclosure.

An implementation of the present disclosure also provides hardware architecture of a sender device or a receiver device, as shown in FIG. 6, including at least one processor 61, a memory 62, and at least one network interface 63. The various components are coupled together by a bus system 64. It may be understood that the bus system 64 is used for implementing connection and communication between these components. In addition to a data bus, the bus system 64 includes a power bus, a control bus, and a status signal bus. However, for clarity, all kinds of buses are uniformly referred to as a bus system 64 in the FIG. 6.

It should be understood that the memory 62 in implementations of the present disclosure may be a volatile memory or a non-volatile memory, or it may include both volatile and non-volatile memory.

In some implementations, the memory 62 stores following elements, executable modules or data structures, or a subset thereof, or an extended set thereof: an operating system 621 and an application program 622.

The processor 61 is configured to be able to process acts in the method of the aforementioned implementation one or two, which will not be repeated here.

A computer storage medium provided by an implementation of the present disclosure stores computer-executable instructions, the computer-executable instructions, when being executed, implement the acts in the method of the aforementioned implementation one or two.

The above devices in implementations of the present disclosure may also be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes various media capable of storing program codes, such as a U disk, a mobile hard disk, a read-only memory (ROM), a magnetic disk or an optical disk. Thus, the implementations of the present disclosure are not limited to any specific combination of hardware and software.

Correspondingly, an implementation of the present disclosure also provides a computer storage medium in which a computer program is stored, and the computer program is configured to execute the method for distributing data packets in the implementations of the present disclosure.

Although the preferable implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A method for distributing data packets, applied to a sender device, comprising:
when there exists at least one communication link with a 3GPP or non-3GPP network device, determining whether the 3GPP or non-3GPP network device feeds back a transmission status report of the communication link according to bit value of a set flag, wherein the set flag is set through a preset bit to indicate whether the 3GPP or non-3GPP network device feeds back the transmission status report of the communication link through the set flag;
upon determining that the 3GPP or non-3GPP network device feeds back the transmission status report of the communication link according to bit value of the set flag, the method further comprises:
acquiring the transmission status report for the at least one communication link sent by the 3GPP or non-3GPP network device, wherein the transmission status report comprises a quantity of lost data packet and a data rate of the communication link, and wherein the at least one communication link comprises a 3GPP link and a non-3GPP link;
selecting at least part of the at least one communication link and allocating a data transmission amount corresponding to each communication link in the at least part of the at least one communication link, based on the transmission status report for the at least one communication link, wherein the data transmission amount is a data transmission rate; and
sending out data to be sent on the at least part of the at least one communication link, based on the data transmission amount corresponding to the each communication link in the at least part of the at least one communication link.

2. The method of claim 1, wherein acquiring the transmission status report for the at least one communication link sent by the 3GPP or non-3GPP network device, comprises:
acquiring a first lost data packet and a last lost data packet corresponding to each communication link in the at least one communication link sent by the 3GPP or non-3GPP network device for the each communication link, and acquiring a quantity of lost data packets between the first lost data packet and the last lost data packet;
or,
acquiring a quantity of lost data packets or a proportion of lost data packets corresponding to each communication link in the at least one communication link sent by the receiver for the each communication link.

3. The method of claim 1, wherein acquiring the transmission status report for the at least one communication link sent by the 3GPP or non-3GPP network device, comprises:
acquiring a data rate corresponding to each communication link in the at least one communication link sent by the receiver for the each communication link.

4. The method of claim 3, wherein selecting the at least part of the at least one communication link, based on the transmission status report for the at least one communication link, comprises:
selecting a communication link of which a quantity of lost data packets is less than a first threshold or a proportion of lost data packets is less than a second threshold, based on the transmission status report for the at least one communication link;
and/or,
selecting a communication link of which a data rate matches with a service type and/or a transmission rate of a data packet to be sent, based on the transmission status report for the at least one communication link.

5. The method of claim 1, wherein allocating the data transmission amount corresponding to the each communication link in the at least part of the at least one communication link, comprises:
determining the data transmission amount corresponding to each communication link in the at least part of the at least one communication link, based on a quantity of lost data packets or a proportion of lost data packets in the transmission status report for the each communication link;
and/or,
determining the data transmission amount corresponding to each communication link in the at least part of the at least one communication link based on a data rate in the transmission status report for the each communication link.

6. The method of claim 1, wherein the method further comprises:
configuring a sequence number for the data packet to be sent.

7. A sender device, comprising: a processor and a memory for storing a computer program which is capable of running on the processor; wherein the processor is used for, when running the computer program, performing acts of:
when there exists at least one communication link with a 3GPP or non-3GPP network device, determining whether the 3GPP or non-3GPP network device feeds back a transmission status report of the communication link according to bit value of a set flag, wherein the set flag is set through a preset bit to indicate whether the 3GPP or non-3GPP network device feeds back the transmission status report of the communication link through the set flag;
upon determining that the 3GPP or non-3GPP network device feeds back the transmission status report of the communication link according to bit value of the set flag, the processor is further used for, performing acts of:
acquiring the transmission status report for the at least one communication link sent by the 3GPP or non-3GPP network device, wherein the transmission status report comprises a quantity of lost data packet and a data rate of the communication link, and wherein the at least one communication link comprises a 3GPP link and a non-3GPP link;
selecting at least part of the at least one communication link and allocates a data transmission amount corresponding to each communication link in the at least part of the at least one communication link, based on the transmission status report for the at least one communication link, wherein the data transmission amount is a data transmission rate; and
sending out data to be sent on the at least part of the at least one communication link based on the data transmission amount corresponding to the each communication link in the at least part of the at least one communication link.

8. The sender device of claim 7, wherein the processor is used for, when running the computer program, performing an act of: acquiring a first lost data packet and a last lost data packet corresponding to each communication link in the at least one communication link sent by the 3GPP or non-3GPP network device for the each communication link, and acquiring a quantity of lost data packets between the first lost data packet and the last lost data packet;
or,
acquiring a quantity of lost data packets or a proportion of lost data packets corresponding to each communication link in the at least one communication link sent by the receiver for the each communication link.

9. The sender device of claim 7, wherein the processor is used for, when running the computer program, performing an act of: acquiring a data rate corresponding to each communication link in the at least one communication link sent by the receiver for the each communication link.

10. The sender device of claim 9, wherein the processor is used for, when running the computer program, performing an act of: selecting a communication link of which a quantity of lost data packets is less than a first threshold or a proportion of lost data packets is less than a second threshold, based on the transmission status report for the at least one communication link;
and/or,
selecting a communication link a data rate of which matches with a service type and/or a transmission rate of a data packet to be sent, based on the transmission status report for the at least one communication link.

11. The sender device of claim 7, wherein the processor is used for, when running the computer program, performing an act of: determining the data transmission amount corresponding to each communication link in the at least part of the at least one communication link, based on a quantity of lost data packets or a proportion of lost data packets in the transmission status report for the each communication link;
and/or, determining the data transmission amount corresponding to each communication link in the at least part of the at least one communication link based on a data rate in the transmission status report for the each communication link.

12. The sender device of claim 7, wherein the processor is used for, when running the computer program, performing an act of: configuring a sequence number for the data packet to be sent.

13. A receiver device, comprising: a processor and a memory for storing a computer program which is capable of running on the processor, wherein the receiver device is a 3GPP or non-3GPP network device, and wherein the processor is used for, when running the computer program, performing an act of:

when there exists at least one communication link with a sender device, determining whether to feed back the transmission status report of the communication link according to bit value of a set flag, wherein the set flag is set through a preset bit sent by the sender device to determine whether to feed back the transmission status report of the communication link;

upon determining to feed back the transmission status report of the communication link according to bit value of the set flag, the processor is further used for performing the acts of: sending the transmission status report for the at least one communication link to the sender device, wherein the transmission status report comprises a quantity of lost data packet and a data rate of the communication link, wherein the at least one communication link comprises a 3GPP link and a non-3GPP link;

wherein the transmission status report is used for causing the sender device to select at least part of the at least one communication link and allocate a data transmission amount corresponding to each communication link in the at least part of the at least one communication link, based on the transmission status report for the at least one communication link, wherein the data transmission amount is a data transmission rate.

14. The receiver device of claim 13, wherein the processor is used for, when running the computer program, performing an act of: sending a first lost data packet and a last lost data packet corresponding to each communication link in the at least one communication link, and a quantity of lost data packets between the first lost data packet and the last lost data packet to the sender device, for the each communication link;

or, sending a quantity of lost data packets or a proportion of lost data packets corresponding to each communication link in the at least one communication link to the sender device, for the each communication link.

15. The receiver device of claim 14, wherein the processor is used for, when running the computer program, performing an act of:

when a quantity of lost data packets counted exceeds a quantity reporting threshold or a proportion of lost data packets counted exceeds a proportion reporting threshold in a counting period, sending the transmission status report for the at least one communication link to the sender device;

or, when a quantity of lost data packets counted is lower than a quantity reporting threshold or a proportion of lost data packets counted is lower than a proportion reporting threshold in a counting period, sending the transmission status report for the at least one communication link to the sender device.

16. The receiver device of claim 13, wherein the processor is used for, when running the computer program, performing an act of: acquiring a data rate corresponding to each communication link in the at least one communication link; and sending the data rate corresponding to the each communication link to the sender device.

17. The receiver device of claim 16, wherein the processor is used for, when running the computer program, performing an act of: calculating a data rate of each communication link in the counting period, and controlling the second communication unit to send the transmission status report to the sender device when the data rate of the communication link does not exceed a preset rate threshold.

* * * * *